US009849826B2

(12) United States Patent
Zizzadoro

(10) Patent No.: US 9,849,826 B2
(45) Date of Patent: Dec. 26, 2017

(54) AUTOMOTIVE LAMP CONTROL

(71) Applicant: Joseph P. Zizzadoro, Commack, NY (US)

(72) Inventor: Joseph P. Zizzadoro, Commack, NY (US)

(*) Notice: Subject to any disclaimer, the term of this patent is extended or adjusted under 35 U.S.C. 154(b) by 0 days.

(21) Appl. No.: 15/441,467

(22) Filed: Feb. 24, 2017

(65) Prior Publication Data

US 2017/0246981 A1   Aug. 31, 2017

Related U.S. Application Data

(60) Provisional application No. 62/300,420, filed on Feb. 26, 2016.

(51) Int. Cl.
*B60Q 1/26* (2006.01)
*B60Q 1/00* (2006.01)
*B60Q 1/02* (2006.01)

(52) U.S. Cl.
CPC ........... *B60Q 1/0076* (2013.01); *B60Q 1/02* (2013.01)

(58) Field of Classification Search
CPC ........... H05B 33/0815; H05B 33/0818; H05B 41/2828; H05B 41/3921; H05B 41/3927; H05B 37/0236; H01J 25/70; H01J 25/52; H01J 25/58; H01J 19/02; H03B 9/01; B60Q 3/0293; B60Q 11/005; B60Q 1/387; B60Q 1/2603; B60Q 3/048; F21V 23/02; F21V 25/12; A63J 17/00; F21L 14/026
USPC .......................................................... 315/80
See application file for complete search history.

(56) References Cited

U.S. PATENT DOCUMENTS

| 6,097,998 A | 8/2000 | Lancki |
| 6,181,992 B1* | 1/2001 | Gurne .................... B60T 8/885 701/31.4 |
| 6,373,379 B1 | 4/2002 | Frantz |
| 6,717,376 B2* | 4/2004 | Lys .......................... B60Q 1/26 315/292 |
| 7,089,096 B2 | 8/2006 | Liebl et al. |
| 2007/0156311 A1 | 7/2007 | Elcock et al. |

(Continued)

OTHER PUBLICATIONS

International Search Report and Written Opinion dated May 5, 2017 in corresponding International Application No. PCT/US17/19279, 18 pages.

(Continued)

*Primary Examiner* — Minh D A
(74) *Attorney, Agent, or Firm* — Carter, Deluca, Farrell & Schmidt, LLP

(57) ABSTRACT

Apparatuses, methods, and computer-readable media for automotive lamp illumination control are provided. One example apparatus includes a first communication port, a controller device, and a memory. The memory stores instructions that, when executed by the controller device, cause the controller device to detect a user input command entered by way of one or more user input devices, determine whether the user input command corresponds to an action among a plurality of predetermined actions including at least one of commencing an illumination pattern, terminating the illumination pattern, or switching the illumination pattern, and, in a case where it is determined that the user input command corresponds to the action among the plurality of predetermined actions, cause the action to be executed.

20 Claims, 12 Drawing Sheets

(56) References Cited

U.S. PATENT DOCUMENTS

| | | |
|---|---|---|
| 2008/0082221 A1 | 4/2008 | Nagy |
| 2010/0318266 A1 | 12/2010 | Schaaf et al. |
| 2013/0110321 A1 | 5/2013 | Van Wiemeersch et al. |
| 2015/0100203 A1 | 4/2015 | Tai et al. |
| 2015/0116079 A1 | 4/2015 | Mishra et al. |

OTHER PUBLICATIONS

International Search Report and Written Opinion dated May 16, 2017 in corresponding International Application No. PCT/US17/19276, 16 pages.

\* cited by examiner ical Patent Application No. 62/300,420, filed on Feb. 26,
AUTOMOTIVE LAMP CONTROL

CROSS-REFERENCE TO RELATED APPLICATION

The present application claims the benefit of U.S. Provisional Patent Application No. 62/300,420, filed on Feb. 26, 2016, the entire contents of which are hereby incorporated by reference herein.

BACKGROUND

Field

Example aspects described herein relate generally to automotive lamp control, and, more particularly, to systems, apparatuses, methods, and computer-readable media for automotive lamp illumination control and for configuring automotive lamp illumination control.

Related Art

A conventional approach to modifying the manner in which vehicle lamps (also referred to herein as "lights") are illuminated—for example, by causing one or more of the vehicle lamps to flash in one or more illumination patterns (also referred to herein as "light shows")—involves extensive wiring of aftermarket lamp controllers into a vehicle's wiring harness. This approach can be labor intensive and expensive, and can result in a configuration that is not readily enabled, disabled, or modified, but is rather permanent or semi-permanent. Given the foregoing, a need exists for a means of automotive lamp control that does not require an extensive installation of wiring and that can be readily enabled or disabled, for instance, by way of one or more buttons and/or by removing a device from a vehicle's onboard diagnostic (e.g., OBD2) port.

SUMMARY

According to an example embodiment herein, an apparatus for automotive lamp illumination control is described. The apparatus includes a first communication port, a controller device, and a memory. The memory stores instructions that, when executed by the controller device, cause the controller device to detect a user input command entered by way of one or more user input devices; determine whether the user input command corresponds to an action among a plurality of predetermined actions including commencing an illumination pattern, terminating the illumination pattern, and/or switching the illumination pattern; and, in a case where it is determined that the user input command corresponds to the action among the plurality of predetermined actions, cause the action to be executed.

In one example, the detecting of the user input command includes detecting the user input command entered by way of a predetermined command or combination of commands entered by way of a user input device of a vehicle.

In another example, the user input device of the vehicle includes a steering wheel button, a dashboard button, a wireless key fob button, a button located on a door of the vehicle, a key ignition, and/or a voice based user input device.

In a further example, the user input command includes a single command or a combination of a plurality of commands.

In one example, the memory further stores a list of a plurality of user input commands, and the determining whether the user input command corresponds to the action among the plurality of actions includes matching the user input command to one of the plurality of user input commands of the list.

In another example, in a case where it is determined that the user input command corresponds to commencing the illumination pattern, the controller device is configured to cause the commencing of the illumination pattern. The commencing of the illumination pattern includes causing at least one automotive lamp of a plurality of automotive lamps of a vehicle to be illuminated in one or more predetermined patterns.

In a further example, the memory further has stored thereon a lamp control table that includes information relating to the illumination pattern and/or the plurality of automotive lamps of the vehicle. The commencing of the illumination pattern includes performing a lookup, in the lamp control table, based on at least one of the illumination pattern or a sequence number, to determine which one of the plurality of automotive lamps of the vehicle is to be illuminated and/or which code of a plurality of codes corresponds to the determined one of the plurality of automotive lamps. The commencing of the illumination pattern also includes transmitting an illumination pattern commencement message to a control module thereby causing the determined one of the plurality of automotive lamps to be illuminated.

In one example, the lamp control table includes lamp control information associated with a plurality of automotive lamps of a plurality of vehicles, and the performing of the lookup in the lamp table is based at least in part on a vehicle identifier associated with one of the plurality of vehicles.

In another example, the illumination pattern commencement message includes a lamp code corresponding to the determined automotive lamp of the plurality of automotive lamps.

In a further example, the memory further has stored thereon instructions that, when executed by the processor, cause the controller device to wait until a delay of a predetermined amount of time elapses, and, in response to the elapsing of the delay, transmit an illumination pattern termination message to a control module, thereby causing termination of the illumination of the determined automotive lamp of the plurality of automotive lamps.

In one example, the memory further has stored thereon an illumination pattern table including illumination pattern information describing the illumination pattern. The illumination pattern information includes automotive lamp information and/or illumination timing information. The memory further has stored thereon instructions that, when executed by the processor, cause the controller device to determine whether illumination of the at least one automotive lamp is to be repeated based on the illumination pattern table. In a case where it is determined that illumination of at least one automotive lamp is to be repeated, illumination of the at least one automotive lamp is caused to be repeated, and, in a case where it is determined that illumination of the at least one automotive lamp is not to be repeated, a lookup is performed in the lamp control table based on the illumination pattern table, to determine which automotive lamp of the plurality of automotive lamps of the vehicle is to be illuminated next.

In another example, the memory further has stored thereon instructions that, when executed by the processor, cause the controller device to periodically transmit a keepalive message to a control module at a predetermined refresh rate.

In a further example, the memory further has stored thereon instructions that, when executed by the processor, cause the controller device to wait for entry of a user input command to be detected, and, in a case where a predetermined amount of time elapses without detecting entry of the user input command, enter a sleep mode.

In one example, the memory further has stored thereon instructions that, when executed by the processor, cause the controller device to detect entry of the user input command while in the sleep mode, and exit the sleep mode in response to the detection of the entry of the user input command.

In another example, the memory further has stored thereon instructions that, when executed by the processor, cause the controller device to detect a speed of a vehicle and disable commencement of an illumination pattern if the detected speed is greater than zero.

In a further example, the apparatus further includes a communication protocol device configured to communicate messages by way of a communication path of the vehicle according to a predetermined communication protocol. In one example, the communication path includes a controller area network (CAN) bus, and the communication protocol device facilitates communication by way of the CAN bus.

In another example, the first communication port is an on-board diagnostics port.

In a further example, the plurality of automotive lamps includes a high beam lamp, a low beam lamp, a fog lamp, a front turn signal, a daytime running lamp, a parking lamp, a rear turn signal, a brake lamp, a reverse lamp, a center-mounted center stop lamp, and/or a license plate lamp.

According to another example embodiment herein, a method for automotive lamp illumination control is provided. The method includes detecting a user input command entered by way of one or more user input devices; determining whether the user input command corresponds to an action among a plurality of predetermined actions including commencing an illumination pattern, terminating the illumination pattern, and/or switching the illumination pattern; and, in a case where it is determined that the user input command corresponds to the action among the plurality of predetermined actions, causing the action to be executed.

According to another example embodiment herein, a non-transitory computer-readable medium is described. The non-transitory computer-readable medium has instructions stored thereon that, when executed by a processor, cause the processor to perform a method for automotive lamp illumination control. The method includes detecting a user input command entered by way of one or more user input devices; determining whether the user input command corresponds to an action among a plurality of predetermined actions including commencing an illumination pattern, terminating the illumination pattern, and/or switching the illumination pattern; and, in a case where it is determined that the user input command corresponds to the action among the plurality of predetermined actions, causing the action to be executed.

According to an example embodiment herein, a system for configuring automotive lamp illumination control is described. The system includes a computing device and an automotive lamp control device. The computing device includes a processor, a memory coupled to the processor and having instructions stored thereon, a display device, and a first communication port. The automotive lamp control device includes a second communication port. The computing device is communicatively coupled to the automotive lamp control device by way of a communication path including the first communication port and the second communication port. The instructions, when executed by the processor, cause the computing device to generate a graphical user interface for configuring at least one automotive lamp illumination pattern. The graphical user interface includes a plurality of user input elements. The graphical user interface is caused to be displayed by way of the display device. An input command, corresponding to the at least one of the plurality of user input elements, is received by way of at least one of the plurality of user input elements. A message is transmitted to the automotive lamp control device by way of the communication path based on the received input command. The automotive lamp control device is configured to receive the message and perform an action in response to receiving the message.

In one example, the graphical user interface further includes a selectable list of automotive lamps, a plurality of illumination pattern test buttons, and an illumination pattern shortcut input element. Each of the automotive lamps of the selectable list of automotive lamps is selectable for inclusion in the at least one illumination pattern. The plurality of illumination pattern test buttons are selectable to cause the testing of the illumination pattern(s). The illumination pattern shortcut input element is selectable to configure which illumination pattern of a plurality of illumination patterns is commenced in response to the inputting of a predetermined user input command.

In another example, the illumination pattern includes a periodic sequence of initiating and ceasing illumination of one or more of the automotive lamps.

In a further example, the plurality of lamps includes a high beam lamp, a low beam lamp, a fog lamp, a front turn signal, a daytime running lamp, a parking lamp, a rear turn signal, a brake lamp, a reverse lamp, a center-mounted center stop lamp, and/or a license plate lamp.

In one example, the plurality of illumination patterns includes a preconfigured illumination pattern and/or a custom illumination pattern.

In another example, the graphical user interface further includes a custom illumination pattern screen by which a user can configure a custom illumination pattern. The custom illumination pattern screen includes an option to select, from among the plurality of custom illumination patterns, a custom illumination pattern to be generated. In a further example, the custom illumination pattern screen further includes a list of entries for the custom illumination pattern. Each of the entries of the list includes an option to select one or more of the automotive lamps to include in the custom illumination pattern, an option to select an illumination action for the selected one or more automotive lamps for the custom illumination pattern, and an option to select a speed for the illumination action for the selected one or more automotive lamps for the custom illumination pattern.

In one example, a plurality of the automotive lamps are selectable for simultaneous illumination for the custom illumination pattern.

In another example, the illumination action includes repeatedly commencing and ceasing illumination of at least one of the automotive lamps for a predetermined number of repetitions.

In a further example, the option to select the speed includes an option to select the speed from among a plurality of different speeds at which the selected illumination action for the selected one or more of the automotive lamps is executed.

In one example, the custom illumination pattern screen further includes an option to read current values from the automotive lamp control device.

In another example, the custom illumination pattern screen further includes an option to write new illumination pattern data to the automotive lamp control device, and, in response to receiving selection of the option to write new illumination pattern data, the processor transmits a message to the automotive lamp control device to cause the automotive lamp control device to store data corresponding to the customized illumination pattern generated by way of the plurality of user input elements, for use during subsequent execution of the custom illumination pattern.

In a further example, the custom illumination pattern screen further includes an option to reset the plurality of user input elements of the custom illumination pattern screen.

In one example, the custom illumination pattern screen further includes an option for testing the custom illumination pattern and an option for ceasing the testing of the custom illumination pattern.

In another example, the custom illumination pattern screen further includes an option to save custom illumination pattern settings to a file and an option to load custom illumination pattern settings from a file.

In a further example, the automotive lamp control device further includes a memory, and the action that the automotive lamp control device performs in response to receiving the message includes storing in the memory illumination pattern settings that were inputted by way of the plurality of user input elements.

In one example, the automotive lamp control device further includes a third communication port that is configured to be coupled to a communication port of a vehicle.

In another example, the memory further has stored thereon instructions that, when executed by the processor, cause the display device to display, via the graphical user interface, a vehicle motion-related user input element that is selectable to control whether illumination patterns are executable while a vehicle is in motion. A vehicle motion-related setting is received by way of the vehicle motion-related user input element. The vehicle motion-related setting is transmitted to the automotive lamp control device by way of the communication path.

According to another example embodiment herein, a method for configuring automotive lamp illumination control is provided. The method includes, at a computing device: generating a graphical user interface for configuring at least one automotive lamp illumination pattern; causing the graphical user interface to be displayed by way of a display device; receiving, by way of at least one of the plurality of user input elements, an input command corresponding to the at least one of a plurality of user input elements of the graphical user interface; and transmitting, to an automotive lamp control device by way of a communication path including a first communication port of the computing device and a second communication port of the automotive lamp control device, a message based on the received input command. At the automotive lamp control device, the message is received and an action is performed in response to receiving the message.

According to another example embodiment herein, a non-transitory computer-readable medium is described. The non-transitory computer-readable medium has instructions stored thereon that, when executed by a processor, cause the processor to perform a method for configuring automotive lamp illumination control. The method includes, at a computing device: generating a graphical user interface for configuring at least one automotive lamp illumination pattern; causing the graphical user interface to be displayed by way of a display device; receiving, by way of at least one of the plurality of user input elements, an input command corresponding to the at least one of a plurality of user input elements of the graphical user interface; and transmitting, to an automotive lamp control device by way of a communication path including a first communication port of the computing device and a second communication port of the automotive lamp control device, a message based on the received input command. At the automotive lamp control device, the message is received, and an action is performed in response to receiving the message.

BRIEF DESCRIPTION OF THE DRAWINGS

Various aspects and features of the present disclosure are described herein below with references to the drawings, wherein.

DETAILED DESCRIPTION

The present disclosure is directed to systems, apparatuses, methods, and computer-readable media for automotive lamp illumination control and for configuring automotive lamp illumination. In general, the systems, apparatuses, methods, and computer-readable media of the present disclosure provide a means of controlling automotive lamps, for instance, to be illuminated according to one or more illumination patterns, which does not require an extensive installation of wiring and which can be readily enabled or disabled, for instance, by way of one or more buttons and/or by removing a device from a vehicle's onboard diagnostic port.

Figure 1:
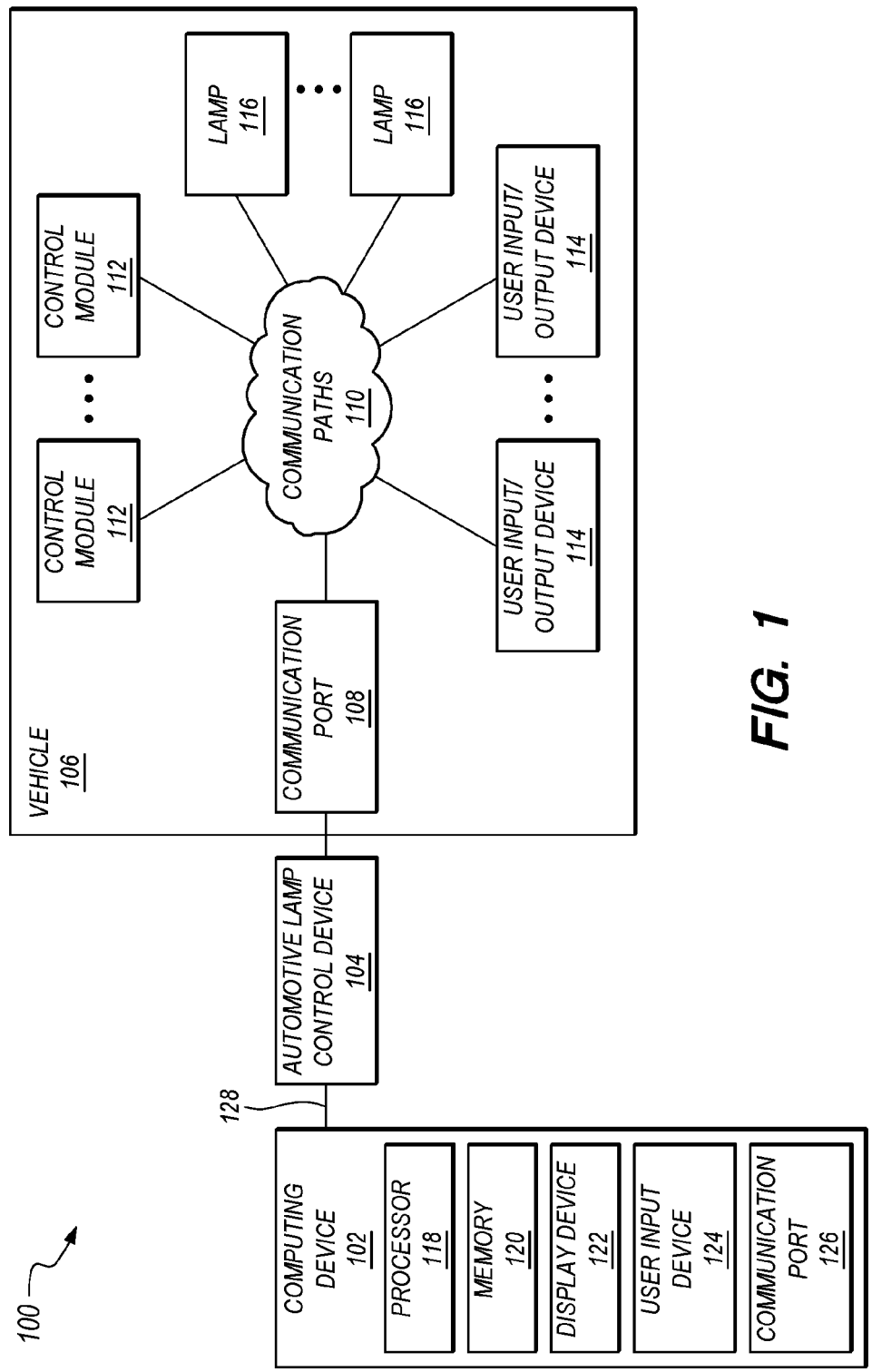
FIG. 1 is a schematic block diagram of an example system for automotive lamp illumination control, in accordance with the present disclosure.

Reference is now made to FIG. 1, which is a schematic block diagram of an example system 100 for automotive lamp illumination control, in accordance with the present disclosure. The system 100 includes a computing device 102, an automotive lamp control device 104, and a vehicle 106. The computing device 102 includes a processor 118, a memory 120, a display device 122, a user input device 124, and a communication port 126. In some embodiments, the computing device 102 is further represented by the computing device 1200 illustrated in FIG. 12, which is described in further detail below. The vehicle 106 includes a communication port 108, communication paths 110, one or more control modules 112, one or more user input and/or output devices (sometimes referred to as input/output devices) 114 and one or more vehicle lamps 116. Various ones of the communication port 108, one or more control modules 112, one or more user input/output devices 114, and one or more vehicle lamps 116 are communicatively coupled to one another by way of the communication paths 110.

The communication port 108 is a port by which the automotive lamp control device 104 can be coupled to, and communicate with, various components of the vehicle 106. In some examples, the communication port 108 is an on-board diagnostics (OBD) port, such as an OBD2 port, that is defined in accordance with a standard, such as the SAE J1962 standard, and that is included on the vehicle 106 by the manufacturer to facilitate diagnosis of various components and/or subsystems of the vehicle 106 using diagnostic equipment.

The communication paths 110 are paths by which one or more signals or messages may be communicated among the communication port 108, the control modules 112, the user input/output devices 114, and/or the lamps 116. When the automotive lamp control device 104 is coupled to the communication port 108, the communication paths 110 facilitate communication of one or more signals or messages between the automotive lamp control device 104 and the control modules 112, the user input/output devices 114, and/or the lamps 116. The communication paths 110 may include any type of communication paths suitable for such communication. In one example, the communication paths 110 include a standardized bus, such as a controller area network (CAN) bus.

The one or more control modules 112 are electronic modules that include hardware and/or software components that cooperate to control one or more components and/or subsystems of the vehicle 106. Example types of the control modules 112 include, without limitation, a body control module, an anti-lock brake control module, a cruise control module, an active damping control module, an occupant restraint control module, a park assist control module, a powertrain control module, a radio control module, a steering column control module, and/or the like.

The user input/output devices 114 generally include devices by which the user may provide input (for example, input relating to one or more illumination patterns and/or input to control the automotive lamp control device 104) and/or devices by which the user may be provided with output (for example, output relating to one or more illumination patterns and/or output indicating a state of the automotive lamp control device 104). Example types of the user input/output devices 114 include, without limitation, a steering wheel button, a dashboard button, a wireless key fob button, a button located on a door of the vehicle, a key ignition, a voice-based user input device, a dashboard screen, a console screen, audio speakers, and/or the like. The user may provide input to the vehicle 106 and/or to the automotive lamp control device 104, by providing one or more user input commands (for example, a single command or a combination of commands) to one or more of the user input devices 114.

The one or more vehicle lamps 116 are lamps that are installed in the vehicle 106 and that may be illuminated for various purposes. Example types of the lamps 116 include, without limitation, a high beam lamp, a low beam lamp, a fog lamp, a front turn signal, a daytime running lamp, a parking lamp, a rear turn signal, a brake lamp, a reverse lamp, a center-mounted center stop lamp, a license plate lamp, and/or the like.

As described in further detail herein, the automotive lamp control device 104 is communicatively and independently couplable to the computing device 102 and to the vehicle 106 by way of communication ports, of which only some are shown in FIG. 1. The automotive lamp control device 104, when coupled to the vehicle 106 (for instance, by being plugged into the communication port 108), enables the user to control automotive lamp illumination (for example, including causing the commencement of one or more illumination patterns of the lamps 116) of the vehicle 106. The computing device 102, when coupled to the automotive lamp control device 104 (for example, by way of the communication port 126 and a communication path 128), enables the user to configure automotive lamp illumination control. For instance, the user can input commands to the computing device 102 to cause the automotive lamp control device 104 to locally store a variety of settings for various illumination patterns, as described in further detail below.

Figure 2:
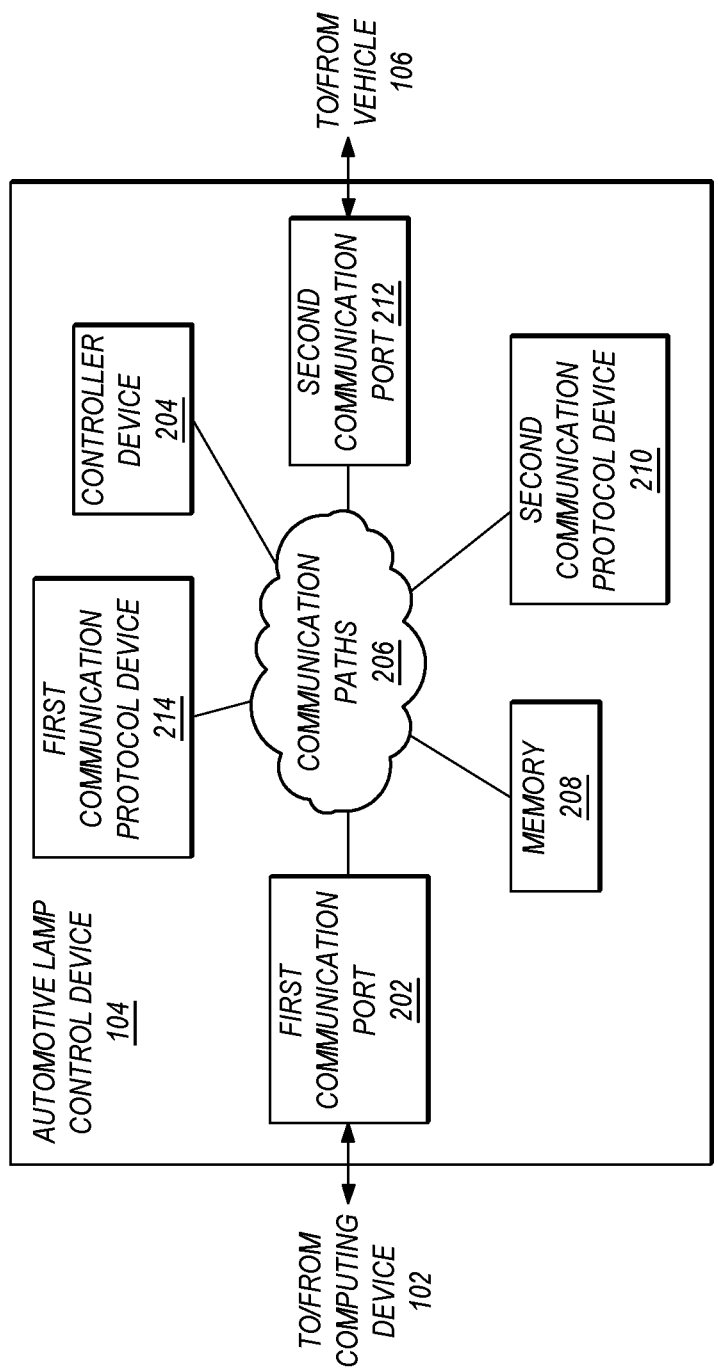
FIG. 2 is a schematic block diagram of an example apparatus for automotive lamp illumination control that may be included in the system of FIG. 1, in accordance with the present disclosure.

Having provided an overview of the system 100 for automotive lamp illumination control in the context of FIG. 1, reference is made to FIG. 2 to describe additional aspects of the automotive lamp control device 104 of the system 100, in accordance with the present disclosure. Additionally, in some embodiments, the automotive lamp control device 104 is further represented by the computing device 1200 illustrated in FIG. 12, which is described in further detail below. Referring to FIG. 2, the automotive lamp control device 104 includes a first communication port 202, a controller device 204, communication paths 206, a memory 208, a first communication protocol device 214, a second communication protocol device 210, and a second communication port 212. Various ones of the first communication port 202, the controller device 204, the memory 208, the first communication protocol device 214, the second communication protocol device 210, and the second communication port 212 are communicatively coupled to one another by way of the communication paths 206.

The first communication port 202 is a port by which the automotive lamp control device 104 may be communicatively coupled to the computing device 102, for example by way of the communication port 126. In some embodiments, the first communication port 202 and the communication port 126 are universal serial bus (USB) ports, the communication path 128 includes a USB cable, and the automotive lamp control device 104 is communicatively couplable to the communication port 126 of the computing device 102 by way of the USB cable of the communication path 128.

The first communication protocol device 214 includes one or more devices that facilitate communication of one or more messages, signals, data, and/or other information to one or more components of the computing device 102 (such as one or more of the processor 118, the memory 120, the display device 122, the user input device 124) by way of the first communication port 202, the communication port 126, and the communication paths 206. In one embodiment, in a case where the first communication port 202 and the communication port 126 are universal serial bus (USB) ports, the first communication protocol device 214 is a USB-compliant device, such as a USB universal asynchronous receiver/transmitter integrated circuit (UART IC) (for example, a Future Technology Devices International Ltd.® FT230X USB to basic UART IC) that facilitate communication of information by way of the communication path 128 implemented by a USB cable. Example aspects of how the computing device 102, when coupled to the automotive lamp control device 104, enables the user to configure automotive lamp illumination control, are described below in connection with FIG. 6 through FIG. 11.

The controller device 204 is a device that controls the operation and/or functionality of the automotive lamp control device 104. In various embodiments, the controller device 204 may be a microcontroller (such as, for example, an Atmel® AT90CAN32 microcontroller, an Atmel® AT90CAN64 microcontroller, an Atmel® ATmega48A microcontroller, or an Atmel® ATmega328A microcontroller), a processor (such as the processor 1204 described below), or any other type of device that controls the operation and/or functionality of the apparatus 104.

The memory 208 is any memory that stores data, instructions, and/or other types of information that the controller device 204 can utilize to effect the operation and/or functionality of the automotive lamp control device 104. The memory 208 may be a standalone memory component or may be integrated into one or more other components of the automotive lamp control device 104, such as the controller device 204. The memory 208 stores, among other information, instructions that the controller device 204 executes to effect the operation and/or functionality of the automotive lamp control device 104, for instance, by implementing steps of the procedures described herein.

As mentioned above, the communication paths 206 communicatively couple the components of the automotive lamp control device 104 to one another. The communication paths 206 may include any type of communication paths suitable to facilitate communication. In one example, one or more of the components of the automotive lamp control device 104 are mounted to a substrate, such as a printed circuit board (not shown in FIG. 1 or FIG. 2), and the communication paths 206 include conductive traces deposited on or within the substrate.

The second communication port 212 is a port by which the automotive lamp control device 104 can be communicatively coupled to one or more components of the vehicle 106 by way of the communication port 108 of the vehicle 106. In one example, the second communication port 212 is an OBD port, such as an OBD2 port, that is defined in accordance with a standard, such as the SAE J1962 standard, and that is couplable to an OBD port (for example, communication port 108) included on the vehicle 106 by the manufacturer. In this manner, the automotive lamp control device 104 is a plug-and-play-type device that can easily be coupled to the vehicle 106 and decoupled from the vehicle 106.

The second communication protocol device 210 includes one or more devices that facilitate communication of one or more messages, signals, data, and/or other information to one or more components of the vehicle 106 (such as one or more of the control modules 112, the user input/output devices 114 and/or the lamps 116) by way of the second communication port 212, the communication port 108 and the communication paths 110. In one embodiment, in a case where the communication paths 110 include a CAN bus, the second communication protocol device 210 includes a CAN bus-compliant device, such as a CAN physical interface chipset (for example, an Atmel® ATA6660 high-speed CAN transceiver), and/or a CAN controller integrated circuit (for example, a Microchip® MCP2515 stand-alone CAN controller with a serial peripheral interface (SPI)) that facilitate communication of information by way of the CAN bus.

Additionally, although not shown in FIG. 2, in various embodiments, the automotive lamp control device 104 also includes one or more additional components that enable the automotive lamp control device 104 to function. Example types of such additional components include a crystal or other clock source that generates a clock signal to be used by one or more of the components of the automotive lamp control device 104; one or more light emitting diodes (LEDs) that are illuminated to indicate status information; one or more power supply components, for instance, a Texas Instruments® uA78L05CPKR voltage regulator, that generates a low voltage power signal, such as a 5 volt power signal, from a higher voltage power signal, such as a 12 volt power signal, that is provided to the automotive lamp control device 104 by the vehicle 106 by way of one or more conductors of the communication port 108 and the second communication port 212; a programming header that is couplable to a programming device to enable the controller device 204 and/or the memory 208 to be programmed with instructions or other information; passive components, such as resistors, inductors, and/or capacitors, and/or the like.

Figure 3:
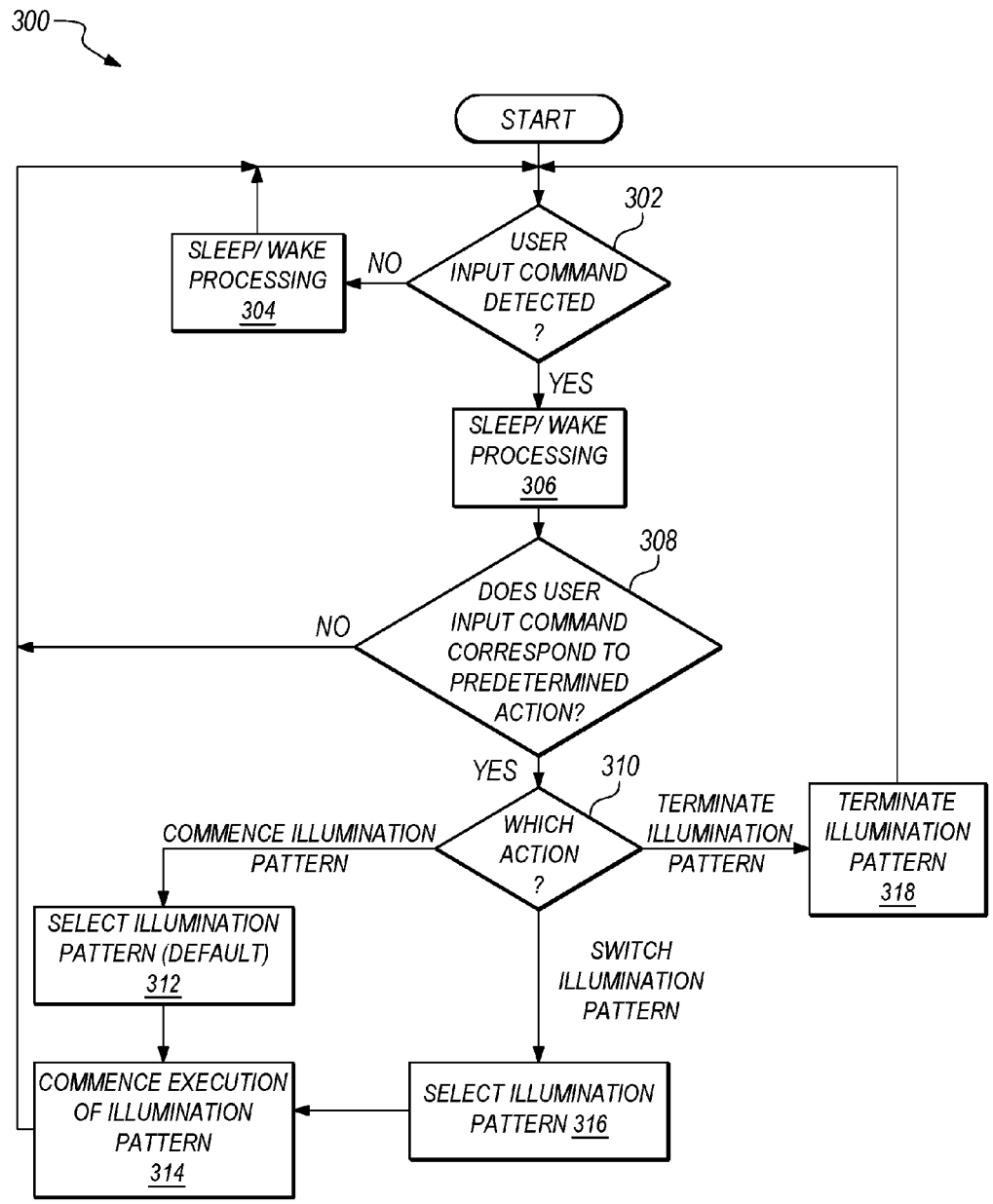
FIG. 3 is a process flow diagram that illustrates an example procedure for automotive lamp illumination control, in accordance with the present disclosure.

Having described the system 100 for automotive lamp illumination control and the automotive lamp control device 104 in the context of FIG. 1 and FIG. 2, reference is made to FIG. 3 to describe an example procedure 300 for controlling automotive lamp illumination by using the automotive lamp control device 104 of the system 100, in accordance with the present disclosure. The procedure 300, in some examples, begins when the automotive lamp control device 104 is plugged into the communication port 108 and receives power from the vehicle by way of one or more pins or conductors of the communication port 108. After the automotive lamp control device 104 is powered on, in some embodiments, certain devices of the automotive lamp control device 104 (for example, the first communication protocol device 214, the second communication protocol device 210, and/or the like) may be configured for proper baud rates.

At block 302, a determination is made as to whether a user input command has been detected. In particular, for instance, the controller device 204 detects whether a user input command has been entered by way of one or more of the user input/output devices 114. In some embodiments, a user may enter the user input command by interacting with one or more of the user input/output devices 114 individually (e.g., entering a predetermined command), or in some simultaneous combination (e.g., actuating a high beam stalk at the same time as pressing a button for increasing cruise control speed) or sequential combination (e.g., entering a predetermined combination of commands). In some embodiments, the detection of user input command entries varies by vehicle. For example, on some vehicles button information is constantly broadcast on a CAN bus, in which case, the determination at block 302 includes monitoring the button information for user input as it is broadcasted. In other vehicles, one or more control modules 112 (for example, a steering column module (SCM) or a wireless control module (WCM), sometimes referred to as a radio frequency hub (RF HUB)) are polled at block 302 by sending an I/O read request and waiting for a response. This may include, in some examples, transmitting to one or more control modules 112, a "start diagnostic session" command, then a "readDataByLocalIdentifier" command together with a value to read the buttons, and also sending a keepalive command (for example, a TesterPresent command) periodically to keep the "readDataByLocalIdentifier" command running.

If it is determined at block 302 that no user input command has been detected ("NO" at 302), then the procedure 300 progresses to block 304. If, on the other hand, it is determined at block 302 that a user input command has been detected ("YES" at 302), then the procedure 300 progresses to block 306. At block 304 and at block 306, as described in further detail below in connection with FIG. 4, an algorithm (e.g., sleep/wake processing) is executed to conserve power in cases when no user input commands are detected for an extended period of time. From block 304, the procedure 300 progresses back to block 302 to continue to monitor for receipt of a user input command. From block 306, the procedure 300 progresses to block 308.

At block 308, a determination is made as to whether the user input that was detected at block 302 corresponds to one or more predetermined actions. The user input command may be any type of user input command, and may correspond to one or more predetermined actions. For instance, the user input command may correspond to commencing an illumination pattern (e.g., causing one or more of the lamps 116 to be illuminated in a predetermined flashing pattern, also referred to as a blinking pattern), terminating the illumination pattern, switching the illumination pattern, and/or the like. In some embodiments, the memory 208 stores a list of multiple user input commands, and at block 308 the determination as to whether the user input command corresponds to one or more predetermined actions includes matching the user input command to one of the user input commands of the list. If it is determined at block 308 that the user input command does not correspond to any one or more predetermined actions ("NO" at block 308), then the procedure 300 progresses back to block 302 to continue to monitor for receipt of a user input command.

If, on the other hand, it is determined at block 308 that the user input command does correspond to one or more predetermined actions ("YES" at block 308), then the procedure 300 progresses to block 310. At block 310, a determination is made as to which particular action corresponds to the user input command, for instance, by performing a lookup in the list of multiple user input commands mentioned above.

If it is determined at block 310 that the user input command corresponds to commencing an illumination pattern ("COMMENCE ILLUMINATION PATTERN" at block 310), then the procedure 300 progresses to block 312. In some embodiments, at block 312, an illumination pattern is selected, for instance, from among multiple illumination patterns stored in the memory 208. In some examples, the illumination pattern that is selected at block 312 is a default illumination pattern that was previously set as the default illumination pattern in the memory 208. At block 314, execution of the illumination pattern selected at block 312 is commenced. Additional aspects of the execution of the illumination pattern at block 314 is described below in the context of the procedure 500 of FIG. 5.

If it is determined at block 310 that the user input command corresponds to switching an illumination pattern ("SWITCH ILLUMINATION PATTERN" at block 310), then the procedure 300 progresses to block 316. At block 316, an illumination pattern is switched by selecting another illumination pattern that is different from the illumination pattern that was previously selected (for example, the illumination pattern selected by default at block 312). In some embodiments, the switching at block 316 is performed by stepping through illumination patterns stored in the memory 208 in one or more predetermined manners (for example, sequentially, randomly, and/or the like). The procedure 300 then progresses back to block 314 to commence execution of the illumination pattern selected at block 316. In this manner, a user may cycle through execution of different illumination patterns that are stored in the memory 208.

If it is determined at block 310 that the user input command corresponds to terminating the execution of an illumination pattern ("TERMINATE ILLUMINATION PATTERN" at block 310), then the procedure 300 progresses to block 318. At block 318, the illumination pattern is terminated, for instance, by resetting the lamps 116. In some embodiments, the termination of the illumination pattern includes transmitting a session end message (for example, an EndDiagSession message) to one or more of the control modules 112 (for example, a body control module), to cause the control module 112 to terminate a session in which the automotive lamp control device 104 may control the illumination of the lamps 116. In some examples, terminating the illumination pattern at block 318 includes, prior to transmitting a session end message, transmitting a return control message (for example, a ReturnControltoECM message) to one or more of the control modules 112 (for example, a body control module) for each of the lamps 116 that were controlled during the sequence and/or illumination pattern. Once the illumination pattern has been terminated, the procedure 300 progresses to block 302 to continue to monitor for receipt of a user input command. In some embodiments, the automotive lamp control device 104 is also configured to detect a speed at which the vehicle 106 is currently traveling, and terminate and/or disable commencement of an illumination pattern if the detected speed is greater than zero. In various embodiments, the vehicle speed can be detected in a variety of ways, such as, for instance, reading from the communication paths 110 (such as a CAN bus or other type of bus) a parameter value that corresponds to the vehicle speed, sending a message to one or more of the control modules 112 to request the vehicle speed according to a standard messaging protocol, and/or the like. In this manner, the user may be prevented from executing an illumination pattern while the vehicle 106 is in motion.

Figure 4:
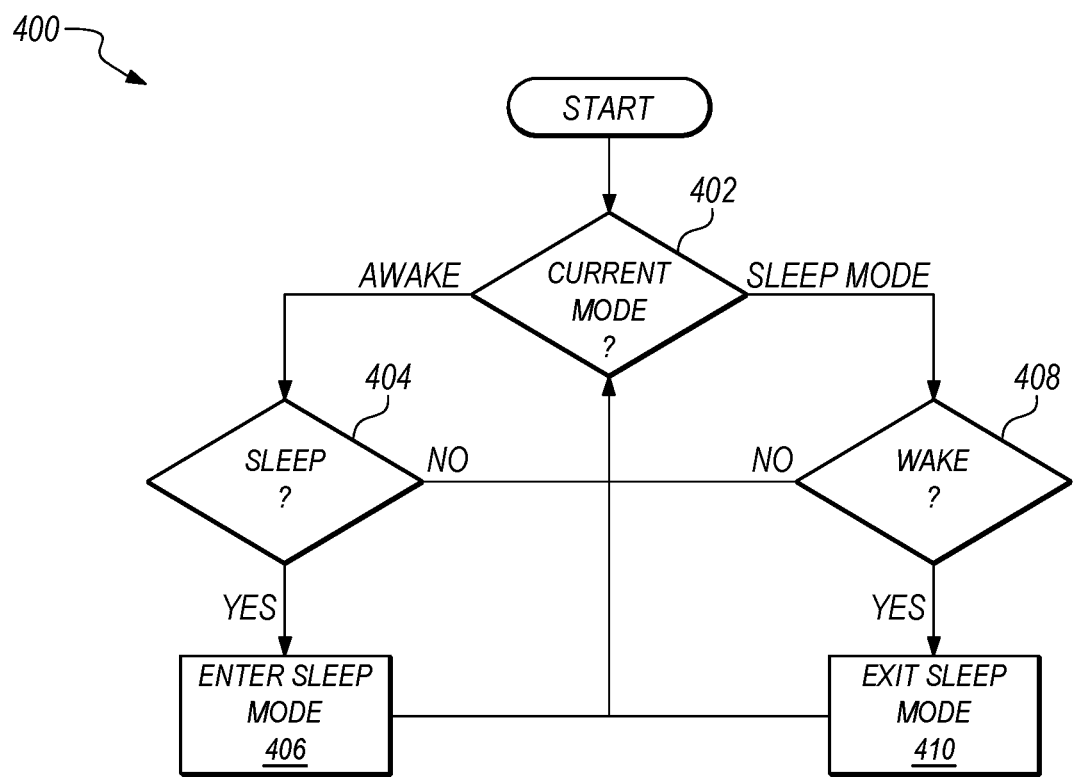
FIG. 4 is a process flow diagram that illustrates additional aspects of the example procedure for automotive lamp illumination control of FIG. 3, in accordance with the present disclosure.

As mentioned above, at block 304 and at block 306 of the procedure 300, an algorithm (e.g., sleep/wake processing) is executed to conserve power in cases when no user input commands are detected for an extended period of time. FIG. 4 is a process flow diagram that illustrates example aspects of the sleep/wake processing algorithm that may be performed at block 304 and/or block 306, in accordance with the present disclosure. In some embodiments, the automotive lamp control device 104 may be in either an awake mode or a sleep mode. The awake mode, for example, is a mode in which the components of the automotive lamp control device 104 are provided with full power, and the sleep mode is a mode in which one or more of the components of the automotive lamp control device 104 are provided with lower power (for instance, an amount of power lower than the full amount of power provided to such components in awake mode). In some examples, upon first being powered on, the automotive lamp control device 104 is in a default mode, which may be the awake mode or the sleep mode, and then the mode is alternated according to the procedure 400 during operation.

At block 402, a determination is made as to whether the automotive lamp control device 104 is currently in the awake mode or sleep mode. If it is determined at block 402 that the automotive lamp control device 104 is currently in an awake mode ("AWAKE" at block 402), then the procedure progresses to block 404. At block 404, a determination is made as to whether to enter the sleep mode. In some example embodiments, if it is determined that no user input command has been received (for example, based on the determination(s) made at block 302) for more than a predetermined threshold amount of time (for example, which may be stored in the memory 208), then it is determined at block 404 to enter the sleep mode to conserve power. If, on the other hand, it is determined that the predetermined threshold amount of time (for example, thirty seconds) has not elapsed since the most recently detected user input command has been received, then it is determined at block 404 not to enter the sleep mode but rather to remain in the awake mode. If it is determined at block 404 not to enter the sleep mode ("NO" at block 404), then the procedure 400 progresses back to block 402 to continue to monitor various factors (for example, receipt of user input commands) to determine whether to enter the sleep mode. If it is determined at block 404 to enter the sleep mode ("YES" at block 404), then the procedure 400 progresses to block 406. At 406, the sleep mode is entered, for example, by causing lower power to be delivered to one or more of components of the automotive lamp control device 104. In some embodiments, sleep mode is entered by commanding the controller device 204 to disable some internal circuitry (e.g., one or more clocks) to reduce the amount of power drawn by the controller device 204 while still permitting the controller device 204 to detect commands.

If it is determined at block 402 that the automotive lamp control device 104 is currently in the sleep mode ("SLEEP MODE" at block 402), then the procedure progresses to block 408. At block 408, a determination is made as to whether to enter the awake mode (that is, to exit the sleep mode). In some example embodiments, if it is determined that no user input command has been received (for example, based on the determination(s) made at block 302) for more than a predetermined threshold amount of time (for example, which may be stored in the memory 208), then, to conserve power, it is determined at block 408 not to enter the awake mode. If, on the other hand, it is determined that a user input command has been received since the sleep mode was previously entered at block 406, then it is determined at block 408 to enter the awake mode. If it is determined at block 408 not to enter the awake mode ("NO" at block 408), then the procedure 400 progresses back to block 402 to continue to monitor various factors (for example, receipt of user input commands) to determine whether to enter the awake mode. If it is determined at block 408 to enter the awake mode ("YES" at block 408), then the procedure 400 progresses to block 410. At 410, the awake mode is entered, for example, by causing full power to be delivered to one or more of components of the automotive lamp control device 104.

Figure 5:
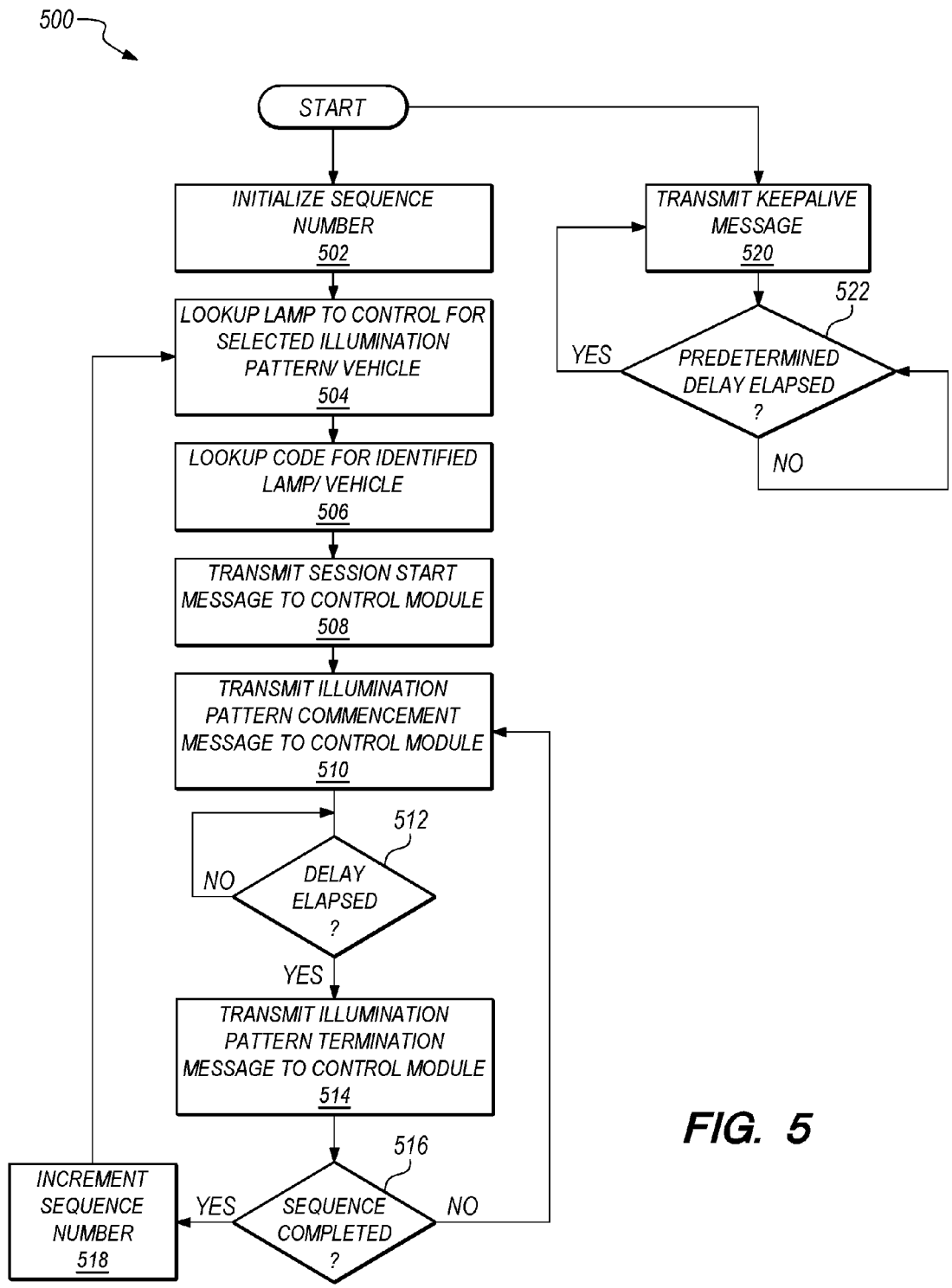
FIG. 5 is a process flow diagram that illustrates still further aspects of the example procedure for automotive lamp illumination control of FIG. 3, in accordance with the present disclosure.

Referring now to FIG. 5, as mentioned above, additional aspects of the execution of the illumination pattern at block 314 is described in the context of the procedure 500, in accordance with the present disclosure. At block 502, a sequence number is initialized. The sequence number, for instance, corresponds to a sequence of the currently selected illumination pattern, for example, a predetermined portion of the illumination pattern in which one or more lamps 116 are flashed in one or more predetermined patterns.

In various embodiments, the memory 208 stores a lamp control table that includes information relating to the currently selected illumination pattern (as well as to one or more other illumination patterns, for instance) and/or information relating to the automotive lamps 116 of the vehicle 106. For example, the lamp control table may include information regarding which one or more of the automotive lamps 116 of the vehicle 106 are to be illuminated for this particular illumination pattern and/or this particular sequence. The lamp control table may further include information regarding which code of multiple codes corresponds to one or more of the automotive lamps 116. The code, for example, may be a code that may be communicated to a control module 112 to control whether the lamp 116 is illuminated. Additional example types of information that may be stored in the lamp control table are described below in connection with FIG. 7 through FIG. 11. In some embodiments, at least a portion of an illumination pattern table, as described below, constitutes the lamp control table. At block 504, a lookup is performed, in the lamp control table, based on the currently selected illumination pattern and/or the current sequence number, to determine which one or more of the automotive lamps 116 of the vehicle 106 are to be illuminated. At block 506, a lookup is performed, in the lamp control table, based on the currently selected illumination pattern and/or the currently selected sequence number, to determine which code(s) correspond(s) to the one or more automotive lamps 116.

In some embodiments, at block 508, a session start message (for example, a StartSpecialSession message) is transmitted to one or more of the control modules 112 (for example, a body control module), to cause the control module 112 to enter a session in which the automotive lamp control device 104 may control the illumination of the lamps 116. At block 510, the controller device 204 causes an illumination pattern commencement message (for example, an IOCTL ON message including the light code identified at block 506 and an indication that the lamp 116 is to be illuminated) to be transmitted to one or more of the control modules 112 that corresponds to the lamp 116 identified at block 504 (for example, by way a path including the second communication protocol device 210, the communication paths 206, the second communication port 212, the communication port 108, and the communication paths 110), thereby causing the lamp 116 to be illuminated as part of the illumination pattern.

At block 512, a determination is made as to whether a predetermined delay period has elapsed. The predetermined delay period represents the amount of time during which the lamp 116 should remain illuminated at this portion of the illumination pattern. In some embodiments, as described below in connection with FIG. 6 through FIG. 11, a user may configure the predetermined delay period for each of a number of illumination patterns. If it is determined at block 512 that the predetermined delay period has not lapsed ("NO" at block 512), then the procedure 500 remains at block 512 until the predetermined delay period has lapsed. If it is determined at block 512 that the predetermined delay period has lapsed ("YES" at block 512), then the procedure 500 progresses to block 514.

At block 514, an illumination pattern termination message (for example, an IOCTL OFF message including the light code identified at block 506 and an indication that illumination of the lamp 116 is to be terminated) is transmitted to the control module 112 (for example, the body control module), thereby causing termination of the illumination of the automotive lamp 116.

In some embodiments, the memory 208 further stores an illumination pattern table including illumination pattern information describing the illumination pattern (and in some cases additional illumination patterns). The illumination pattern information includes automotive lamp information and/or illumination timing information, such as, for example, predetermined delay period amounts, timing for when to start and stop illuminating, flash speed, and/or the like. An example illumination pattern table corresponding to one example illumination pattern including ten sequences with hexadecimal byte values for each entry is shown below as Table 1.

TABLE 1

| Sequence Number | First Lamp to Control | Second Lamp to Control | Action | Delay Amount |
|---|---|---|---|---|
| 00 | 01 | 02 | 02 | 00 |
| 01 | 07 | 08 | 02 | 00 |
| 02 | 0B | 0C | 01 | 00 |
| 03 | 0F | 10 | 01 | 00 |
| 04 | 09 | 0A | 03 | 00 |
| 05 | 13 | 14 | 02 | 00 |
| 06 | 0B | 0C | 00 | 00 |
| 07 | 09 | 0A | 02 | 00 |
| 08 | 0F | 10 | 03 | 00 |
| 09 | 13 | 14 | 04 | 00 |

The entries of the first, leftmost column of Table 1 indicate the particular sequence number of the illumination pattern and, in this example, correspond to sequence 1 through sequence 10, respectively. The entries of the second and third columns of Table 1 indicate the first lamp 116 and the second lamp 116 to be controlled for this particular sequence of the illumination pattern (for instance, configured by way of options 806, as described below). In some examples the values of the entries of the second and third columns of Table 1 are codes that correspond to the particular lamps 116 and this portion of the illumination pattern table represents the lamp control table described above. The entries of the fourth column of Table 1 indicate the particular illumination action for the lamps to be controlled for the correspondence sequence (for instance, configured by way of options 808, as described below). In one example, the entries of the fourth column of Table 1 may range from 00 for OFF, 01 for ON, or from 02 through 0B (in hexadecimal) for 1 to 10 flashes, respectively. The entries of the fifth, rightmost column of Table 1 indicate either (1) the duration of time delay between flashes, for sequences having lamp(s) 116 configured to flash during the sequence, or (2) the duration of time to delay before proceeding to the next sequence, for sequences having lamp(s) 116 configured not to flash during the sequence but rather to remain ON or OFF during the sequence. The entries of the fifth, rightmost column of Table 1, in some examples, are configured by way of options 810, as described below.

At block 516, a determination is made as to whether the present sequence (e.g., flash sequence) is completed (that is, whether illumination of the automotive lamp 116 is to be repeated) based on the illumination pattern table. If it is determined at block 516 that the sequence is not completed ("NO" at block 516), or in other words that illumination of the automotive lamp 116 is to be repeated, then the procedure 500 progresses back to block 510 to cause illumination of the automotive lamp 116 to be repeated.

If, on the other hand, it is determined at block 516 that the sequence is completed ("YES" at block 516), or in other words that illumination of the automotive lamp 116 is not to be repeated, then the procedure 500 progresses to block 518 to progress to the next sequence. At block 518, the sequence number is incremented to initiate the next sequence. Then the procedure 500 progresses back to block 504 to perform a lookup, in the lamp control table, based on the illumination pattern table, to determine which automotive lamp 116 of the vehicle 106 is to be illuminated next for this illumination pattern.

At block 520, in parallel with execution of the procedures of blocks 502 through 518, a keepalive message (for example, a tester present message) is transmitted to the control module 112 (for example, the body control module), to cause the control module 112 to remain in a mode in which it is receptive to additional messages from the automotive lamp control device 104. At block 522, a determination is made as to whether a predetermined delay period has lapsed before another keepalive message should be transmitted. The predetermined delay period, in some examples, is set to be small enough to cause the control module 112 to remain in the mode in which the control module 112 is receptive to additional messages from the automotive lamp control device 104, without reverting to a mode in which it is not receptive to messages from the automotive lamp control device 104. If it is determined at block 522 that the predetermined delay period has lapsed ("YES" at block 522), then the procedure 500 progresses back to block 520 to transmit another keepalive message. If, on the other hand, it is determined at block 522 that the predetermined delay period has not yet lapsed ("NO" at block 522), then the procedure 500 remains at block 522 to await the lapsing of the predetermined delay period.

Figure 6:
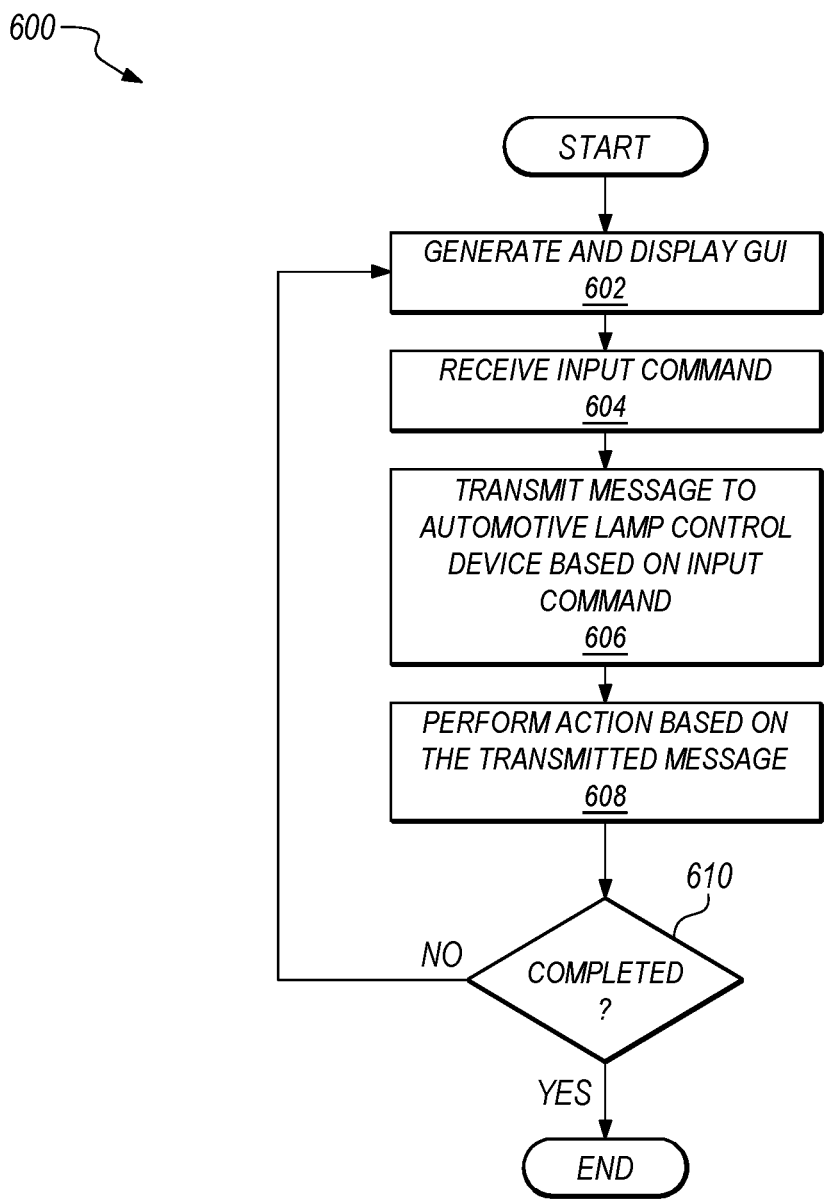
FIG. 6 is a process flow diagram that illustrates an example procedure for configuring automotive lamp illumination, in accordance with the present disclosure.

FIG. 6 is a process flow diagram that illustrates an example procedure 600 for configuring automotive lamp illumination, in accordance with the present disclosure. In some example embodiments, the procedure 600 generally includes communicatively coupling the computing device 102, such as a laptop computer, to the automotive lamp control device 104, for example, by way of the communication path 128, which may include a USB cable. The automotive lamp control device 104 may be coupled or uncoupled to the vehicle 106 during execution of the procedure 600. Once the computing device 102 is coupled to the automotive lamp control device 104, at block 602 the user launches an application stored on the computing device 102 (for example in the memory 120) to cause the one or more graphical user interfaces (GUIs) to be generated and displayed by way of the display device 122. As described in further detail below, the GUIs include user input elements by which the user may configure the automotive lamp control device 104. Example GUIs that may be generated and displayed at block 602 include the user interfaces 700, 800, 900, 1000, and 1100 of FIG. 7 through FIG. 11. Additional details regarding the user interfaces of FIG. 7 through FIG. 11 are described after an overview of the procedure 600 is provided.

At block 604, an input command, which corresponds to one of the plurality of user input elements of the GUI, is received by way of that particular user input element. At block 606, a message is transmitted to the automotive lamp control device 104 by way of the communication path 128, based on the input command received at block 604. At block 608, the automotive lamp control device 104 performs an action in response to receiving the message. In some embodiments, the action that the automotive lamp control device 104 performs in response to receiving the message includes storing in the memory 208 one or more illumination pattern settings that were inputted by way of the user input elements of the GUI(s). At block 610, a determination is made as to whether configuration is completed, for example, whether the application has been terminated. If it is determined at block 610 that configuration is not completed ("NO" at block 610), then the procedure 600 progresses back to block 602 to continue to generate GUI(s) by which the user may configure the automotive lamp control device 104. If it is determined at block 610 that configuration is completed ("YES" at block 610), then the procedure 600 terminates.

Figure 7:
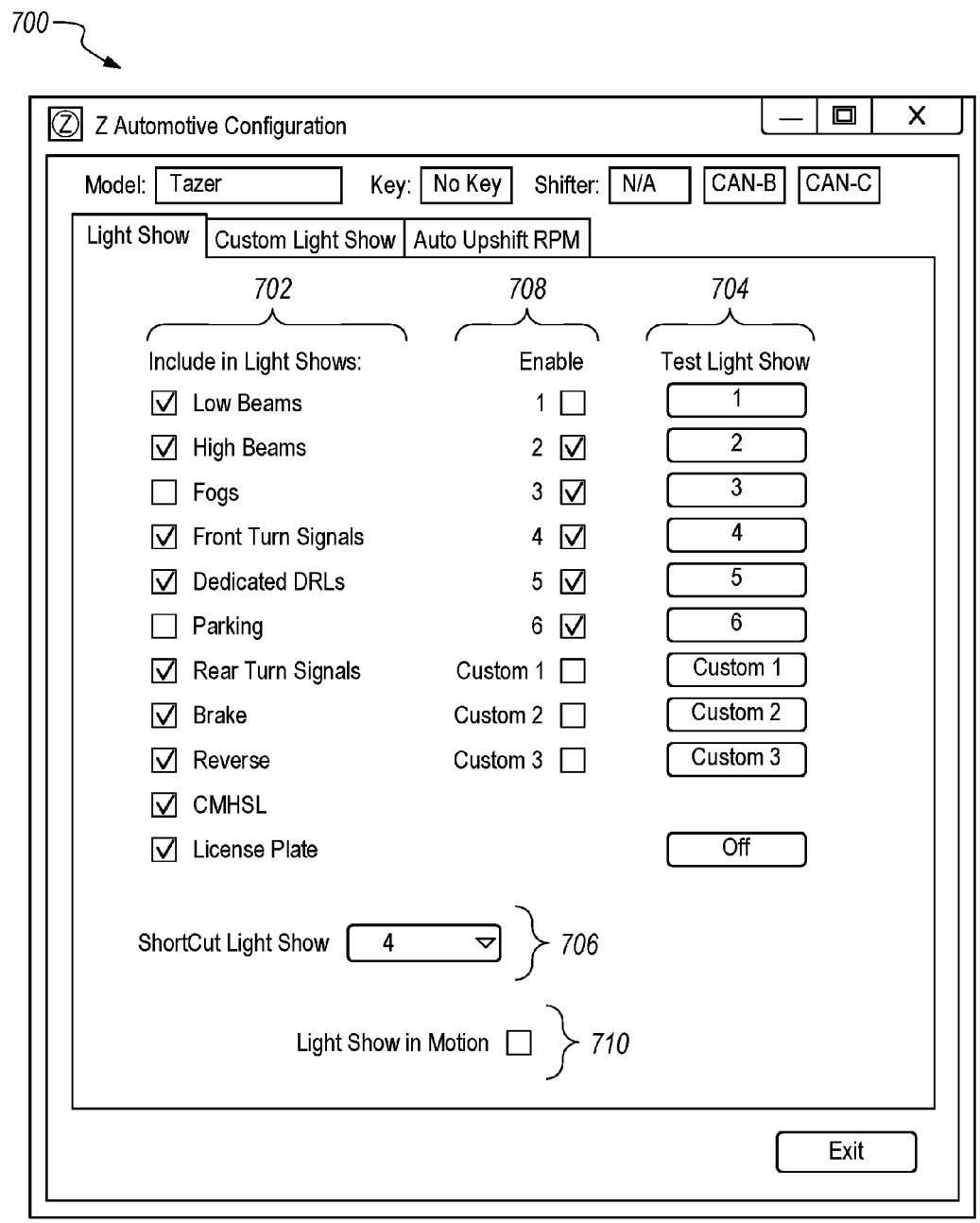
FIG. 7 illustrates an example user interface for configuring automotive lamp illumination, in accordance with the present disclosure.

Referring now to FIG. 7, an example user interface 700 for employing the procedure 600 to configure the automotive lamp control device 104 is illustrated, in accordance with the present disclosure. The user interface 700 includes a number of user input elements. For instance, the user interface 700 includes a selectable list 702 of automotive lamps 116, by which each of the automotive lamps 116 is selectable for inclusion in an illumination pattern. Any set of lamps 116 may be selected or deselected using the checkboxes in the list 702 so that the lamps 116 can be included or excluded from user for any reason (for example, for legality reasons or merely a personal preference). The user interface 700 also includes illumination pattern test buttons 704, which are individually selectable to cause the testing of one or more corresponding illumination patterns (for example, the execution of the illumination pattern) either currently being configured or currently stored in the memory 208. The user interface 700 also includes an illumination pattern shortcut input element 706 that is selectable to configure which illumination pattern of the multiple illumination patterns is commenced in response to the inputting of a predetermined user input command or shortcut. The user interface 700 includes a list of enable inputs 708 that are individually selectable to enable or disable corresponding illumination patterns from execution for the vehicle 106. The user interface 700 also includes a vehicle motion-related user input element 710 that is selectable to control whether illumination patterns are executable while the vehicle 106 is in motion. In this manner, based on the setting of the vehicle motion related user input element 710, the automotive lamp control device 104 can receive the vehicle motion related setting to control whether illumination patterns are executable while the 106 vehicle is in motion.

Figure 8:
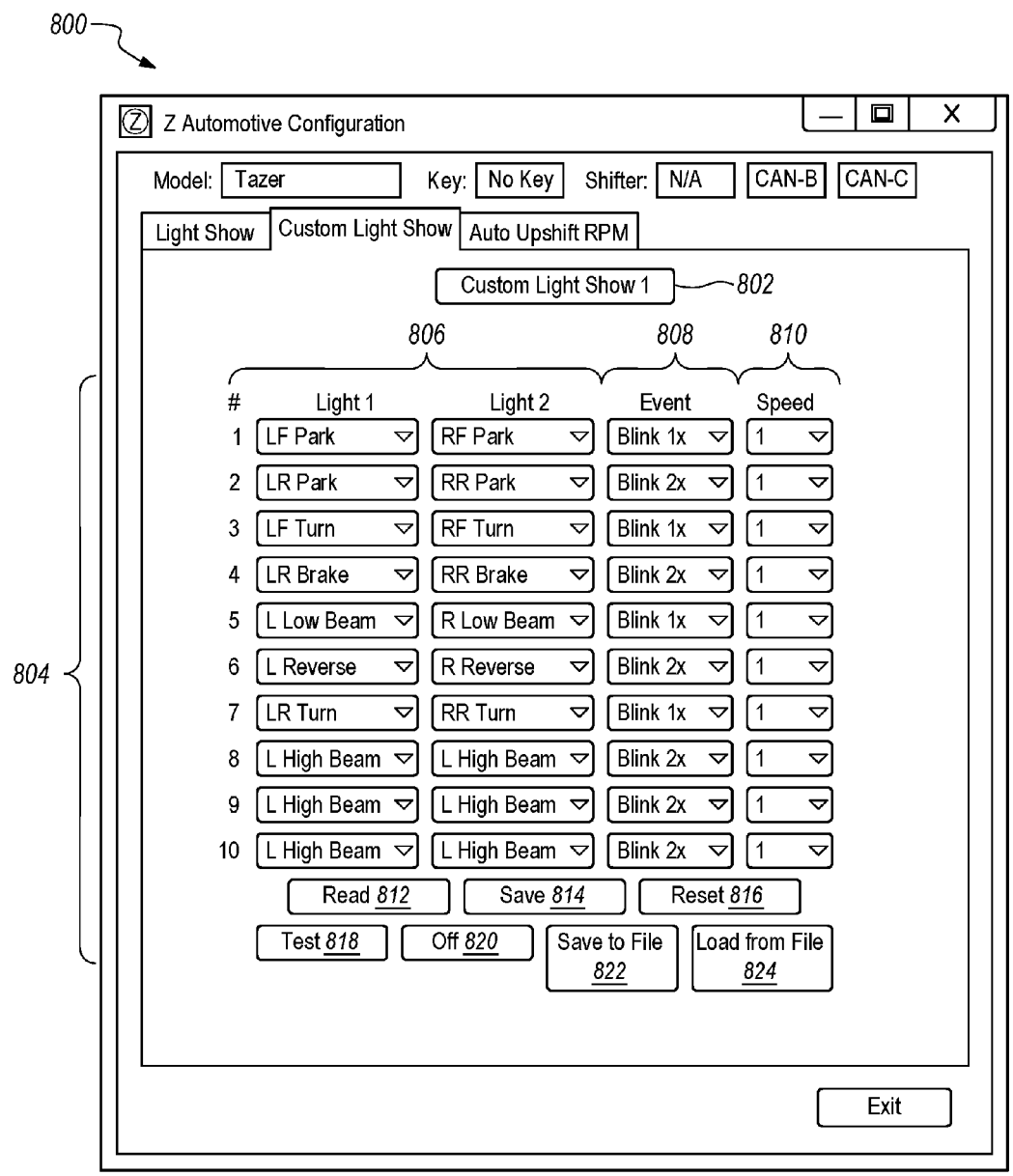
FIG. 8 illustrates another example user interface for configuring automotive lamp illumination, in accordance with the present disclosure.

Referring now to FIG. 8, an example user interface 800 for employing the procedure 600 to configure the automotive lamp control device 104 is illustrated, in accordance with the present disclosure. The user interface 800, in some examples, represents an illumination pattern screen that includes a number of user input elements by which a user can configure a custom illumination pattern. For instance, the user interface 800 includes an option 802 to select, from among multiple custom illumination patterns, a custom illumination pattern to be generated. For instance, the option 802 may be selected to toggle between custom illumination patterns for configuration. The user interface 800 also includes a list of entries 804 for the custom illumination pattern. Each of the entries 804 of the list include an option 806 to select one or more of the automotive lamps 116 to include in the custom illumination pattern, an option 808 to select an illumination action for the selected automotive lamp(s) 116 for the custom illumination pattern, and an option 810 to select a speed for the illumination action for the selected one or more automotive lamps for the custom illumination pattern. In some embodiments, multiple of the automotive lamps 116 are selectable for simultaneous illumination for the custom illumination pattern. The illumination action, in some examples, includes repeatedly commencing and ceasing illumination of at least one of the automotive lamps 116 for a predetermined number of repetitions. In some embodiments, each custom illumination pattern is a sequence of multiple (for example, ten) repeating sequences (each sequence having a particular sequence number and corresponding to a particular entry of the user interface 800), wherein the user can select one or two lamps 116 for each sequence, and can select whether to turn those lamps 116 on or off throughout the entire sequence, or how many times to flash those lamps 116 during the sequence, the amount of time to delay before entering the next sequence, and/or the duration of the flashes of the lamps 116 for the sequence. The option 810 to select the speed includes an option to select the speed from among multiple different speeds at which the selected illumination action for the selected one or more of the automotive lamps is executed.

The user interface 800 further includes an option 812 to read current values from the automotive lamp control device 104, for example by communicating with the memory 208. The user interface 800 further includes an option 814 to write new illumination pattern data to the automotive lamp control device 114. In response to receiving selection of the option 814 to write new illumination pattern data, a message is transmitted to the automotive lamp control device 104 to cause the automotive lamp control device 104 to store data corresponding to the customized illumination pattern generated by way of the user input elements of the user interface 800, for use during subsequent execution of the custom illumination pattern. The user interface 800 further includes an option 816 to reset the user input elements of the user interface 800 by clearing the entries of the user input elements of the user interface 800 and writing those values to the memory 208. The user interface 800 further includes an option 818 for testing the custom illumination pattern and an option 820 for ceasing the testing of the custom illumination pattern. 15. The user interface 800 further includes an option 822 to save custom illumination pattern settings to a file (for example, in the memory 120 of the computing device 102) and an option 824 to load custom illumination pattern settings from a file.

Figure 9:
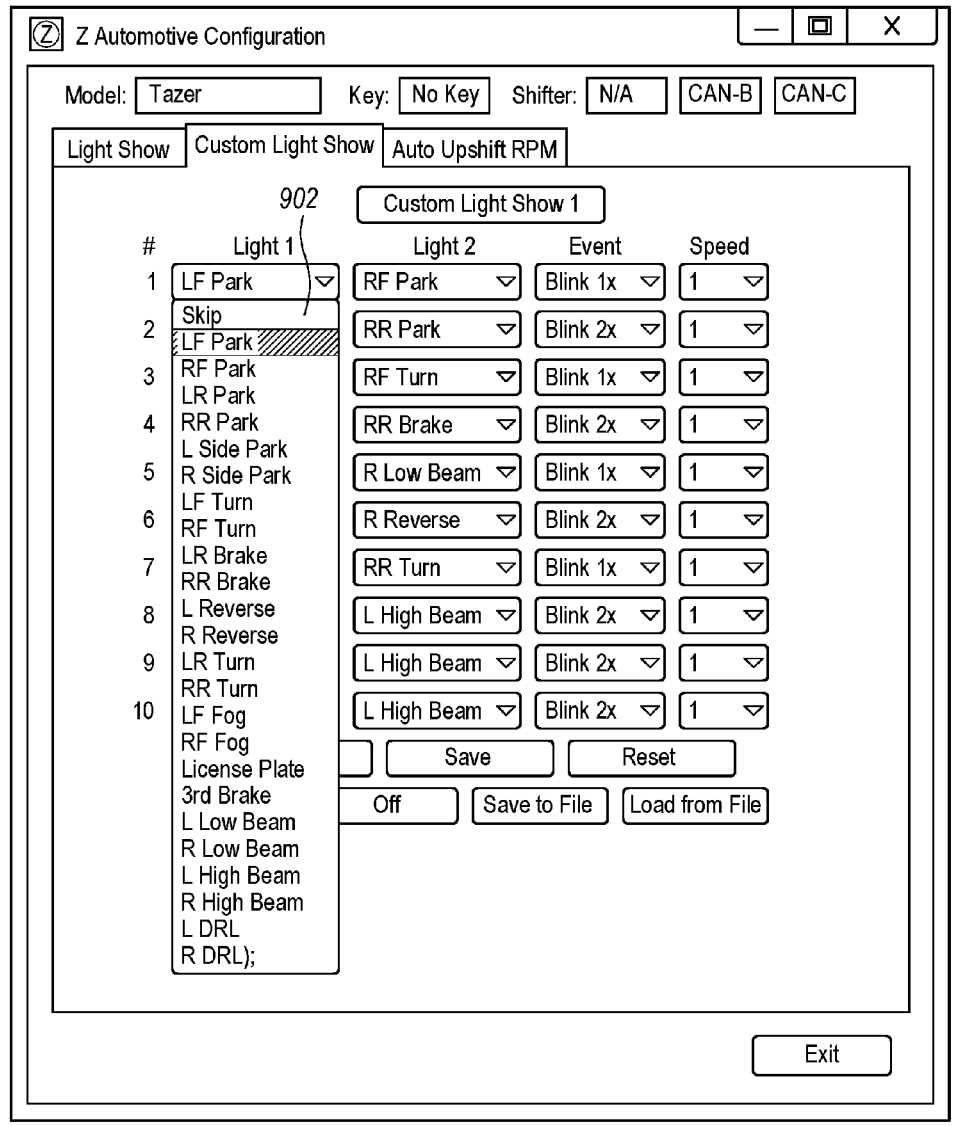
FIG. 9 illustrates another view of the example user interface of FIG. 8, in accordance with the present disclosure.
Figure 10:
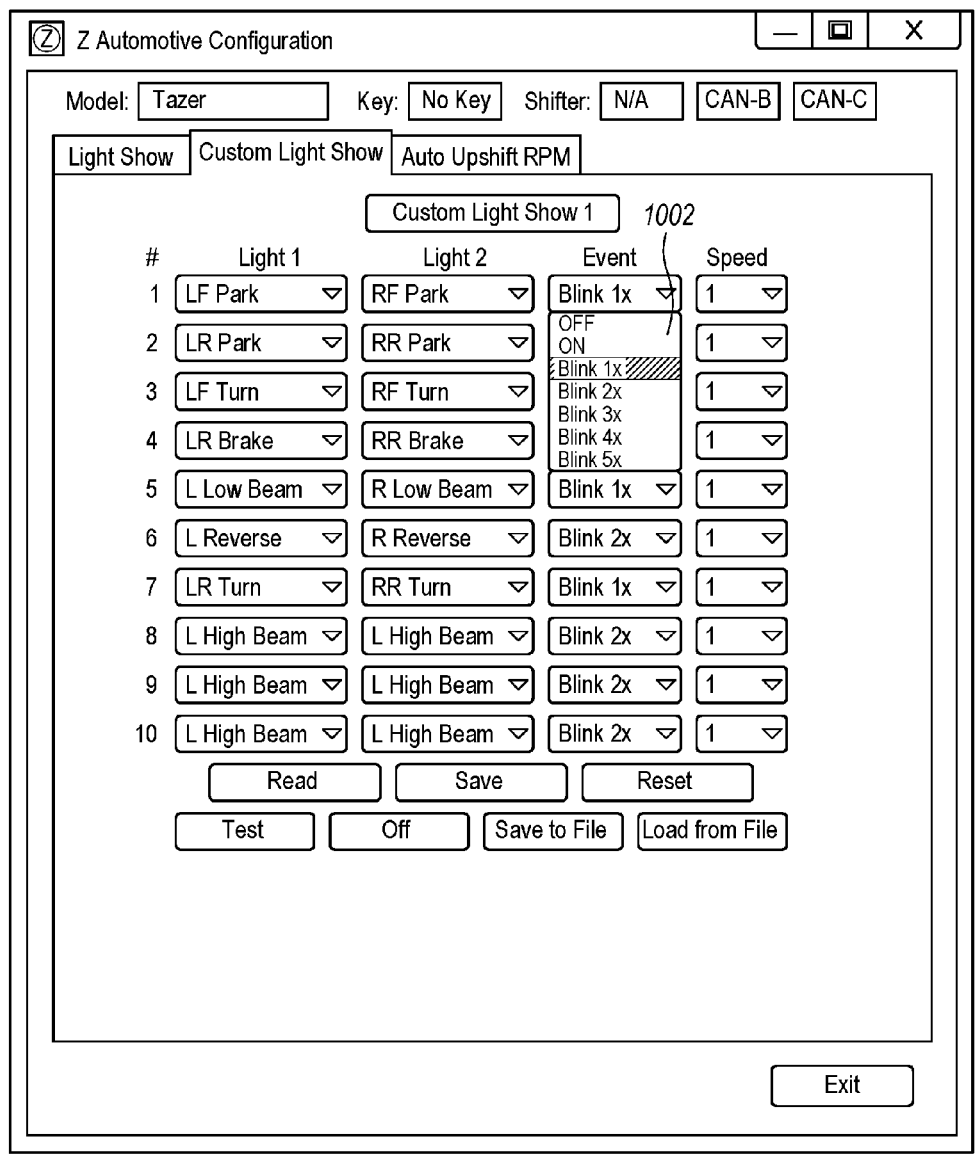
FIG. 10 illustrates yet another view of the example user interface of FIG. 8, in accordance with the present disclosure.
Figure 11:
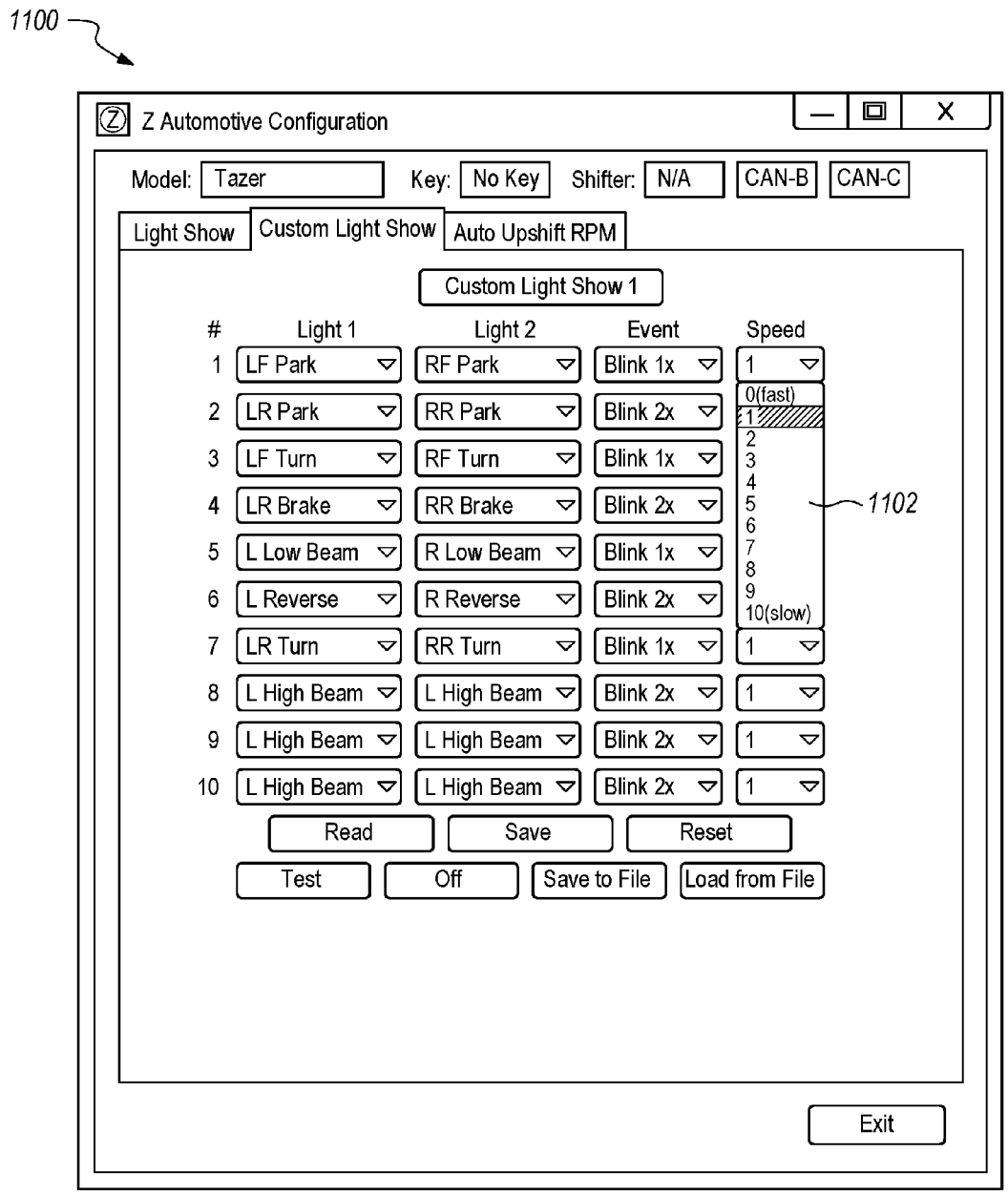
FIG. 11 illustrates a further view of the example user interface of FIG. 8, in accordance with the present disclosure.

Referring now to FIG. 9, another view 900 of the example user interface 800 for employing the procedure 600 to configure the automotive lamp control device 104 is illustrated, in accordance with the present disclosure. In particular, the view 900 shows a dropdown box 902 that lists example types of lamps 116 that may be selected by way of the user interface 800. FIG. 10 shows another view 1000 of the example user interface 800 for employing the procedure 600 to configure the automotive lamp control device 104. In particular, the view 1000 shows a dropdown box 1002 that lists example types of actions that may be selected by way of the user interface 800, for instance, enabling selection of a number of times a lamp 116 is to flash during a sequence and/or whether the lamp 116 should be on or off throughout the entire sequence. FIG. 11 shows another view 1100 of the example user interface 800 for employing the procedure 600 to configure the automotive lamp control device 104. In particular, the view 1100 shows a dropdown box 1102 that lists example types of speeds that may be selected by way of the user interface 800, for instance, with selections from zero to ten corresponding to 50 millisecond and 200 millisecond delays, respectively, between flashes.

Figure 12:
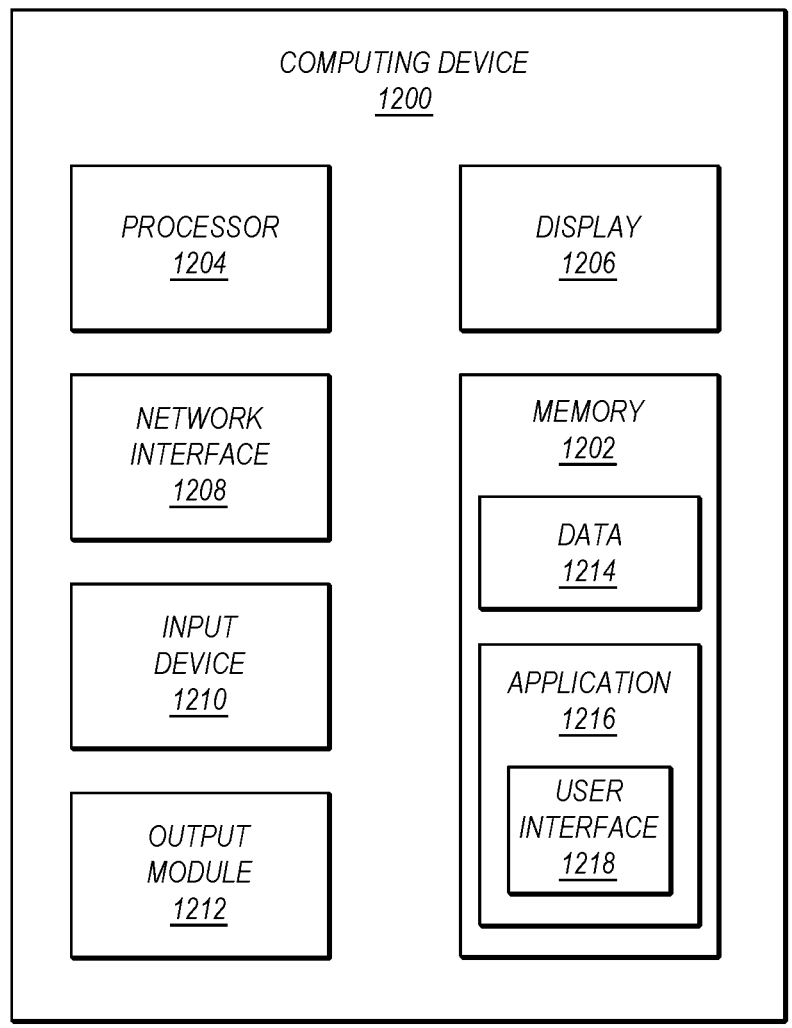
FIG. 12 is a schematic block diagram of an example computing device that may be employed in various embodiments of the present disclosure.

FIG. 12 is a schematic block diagram of a computing device 1200 that may be employed in accordance with various example aspects herein. Although not explicitly shown in FIG. 1 or FIG. 2, in some example embodiments, the computing device 1200, or one or more of the components thereof, are included in, and/or employed within, one or more components of the system 100, such as, for example, the computing device 102, the automotive illumination control apparatus 104, and/or other components. In this regard, the computing device 1200, or one or more of the components thereof, may further represent one or more components of the system 100, such as, for example, the computing device 102, the automotive illumination control apparatus 104.

The computing device 1200 may, in various embodiments, include one or more memories 1202, processors 1204, displays 1206, network interfaces 1208, input devices 1210, and/or output modules 1212. The memory 1202 includes non-transitory computer-readable storage media for storing data and/or software that is executable by the processor 1204 and which controls the operation of the computing device 1200. In an example embodiment, the memory 1202 may include one or more solid-state storage devices such as flash memory chips. Alternatively, or in addition to the one or more solid-state storage devices, the memory 1202 may include one or more mass storage devices connected to the processor 1204 through a mass storage controller (not shown in FIG. 12) and a communications bus (not shown in FIG. 12). Although the description of computer-readable media contained herein refers to a solid-state storage, it should be appreciated by those skilled in the art that computer-readable storage media can be any available media that can be accessed by the processor 1204. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 1200.

In some embodiments, the memory 1202 stores data 1214 and/or an application 1216. In some aspects the application 1216 includes a user interface component 1218 that, when executed by the processor 1204, causes the display 1206 to present a user interface (not shown in FIG. 12), such as one or more of the user interfaces 700, 800, 900, 1000, and/or 1100 (FIGS. 7, 8, 9, 10, and/or 11, respectively) that may be provided by way the display device 122 of the computing device 102 (FIG. 1). The network interface 1208, in some examples, is configured to couple the computing device 1200 and/or individual components thereof to a network, such as a wired network, a wireless network, a local area network (LAN), a wide area network (WAN), a wireless mobile network, a Bluetooth network, the Internet, and/or another type of network. The input device 1210 may be any device by means of which a user may interact with the computing device 1200. Examples of the input device 1210 include without limitation a mouse, a keyboard, a touch screen, a voice interface, and/or the like. The output module 1212 may, in various embodiments, include any connectivity port or bus, such as, for example, a parallel port, a serial port, a universal serial bus (USB), or any other similar connectivity port known to those skilled in the art.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An apparatus for automotive lamp illumination control, the apparatus comprising:
    a first communication port;
    a controller device; and
    a memory storing instructions that, when executed by the controller device, cause the controller device to:
        detect a user input command entered by way of one or more user input devices,
        determine whether the user input command corresponds to an action among a plurality of predetermined actions including at least one of commencing an illumination pattern, terminating the illumination pattern, or switching the illumination pattern, and
        in a case where it is determined that the user input command corresponds to the action among the plurality of predetermined actions, cause the action to be executed.

2. The apparatus of claim 1, wherein the detecting of the user input command includes detecting the user input command entered by way of a predetermined command or combination of commands entered by way of a user input device of a vehicle.

3. The apparatus of claim 2, wherein the user input device of the vehicle includes at least one of a steering wheel button, a dashboard button, a wireless key fob button, a button located on a door of the vehicle, a key ignition, or a voice-based user input device.

4. The apparatus of claim 1, wherein the user input command includes a single command or a combination of a plurality of commands.

5. The apparatus of claim 1, wherein the memory further stores a list of a plurality of user input commands, and wherein the determining whether the user input command corresponds to the action among the plurality of actions includes matching the user input command to one of the plurality of user input commands of the list.

6. The apparatus of claim 1, wherein, in a case where it is determined that the user input command corresponds to commencing the illumination pattern, the controller device is configured to cause the commencing of the illumination pattern, wherein the commencing of the illumination pattern includes causing at least one automotive lamp of a plurality of automotive lamps of a vehicle to be illuminated in one or more predetermined patterns.

7. The apparatus of claim 6, wherein the memory further has stored thereon a lamp control table that includes information relating to at least one of the illumination pattern or the plurality of automotive lamps of the vehicle, and wherein the commencing of the illumination pattern includes:
    performing a lookup, in the lamp control table, based on at least one of the illumination pattern or a sequence number, to determine at least one of which one of the plurality of automotive lamps of the vehicle is to be illuminated or which code of a plurality of codes corresponds to the determined one of the plurality of automotive lamps, and
    transmitting an illumination pattern commencement message to a control module thereby causing the determined one of the plurality of automotive lamps to be illuminated.

8. The apparatus of claim 7, wherein the lamp control table includes lamp control information associated with a plurality of automotive lamps of a plurality of vehicles, and wherein the performing of the lookup in the lamp table is based at least in part on a vehicle identifier associated with one of the plurality of vehicles.

9. The apparatus of claim 7, wherein the illumination pattern commencement message includes a lamp code corresponding to the determined automotive lamp of the plurality of automotive lamps.

10. The apparatus of claim 6, wherein the memory further has stored thereon instructions that, when executed by the processor, cause the controller device to:
    wait until a delay of a predetermined amount of time elapses, and
    in response to the elapsing of the delay, transmit an illumination pattern termination message to a control module, thereby causing termination of the illumination of the determined automotive lamp of the plurality of automotive lamps.

11. The apparatus of claim 6, wherein the memory further has stored thereon:
    an illumination pattern table including illumination pattern information describing the illumination pattern, wherein the illumination pattern information includes at least one of automotive lamp information or illumination timing information, and
    instructions that, when executed by the processor, cause the controller device to:
        determine whether illumination of the at least one automotive lamp is to be repeated based on the illumination pattern table;
        in a case where it is determined that illumination of at least one automotive lamp is to be repeated,
            cause illumination of the at least one automotive lamp to be repeated; and
        in a case where it is determined that illumination of the at least one automotive lamp is not to be repeated:
            perform a lookup, in the lamp control table, based on the illumination pattern table, to determine which automotive lamp of the plurality of automotive lamps of the vehicle is to be illuminated next.

12. The apparatus of claim 1, wherein the memory further has stored thereon instructions that, when executed by the processor, cause the controller device to:
    periodically transmit a keepalive message to a control module at a predetermined refresh rate.

13. The apparatus of claim 1, wherein the memory further has stored thereon instructions that, when executed by the processor, cause the controller device to:
    wait for entry of a user input command to be detected; and
    in a case where a predetermined amount of time elapses without detecting entry of the user input command, enter a sleep mode.

14. The apparatus of claim 13, wherein the memory further has stored thereon instructions that, when executed by the processor, cause the controller device to:

detect entry of the user input command while in the sleep mode; and exit the sleep mode in response to the detection of the entry of the user input command.

15. The apparatus of claim 1, wherein the memory further has stored thereon instructions that, when executed by the processor, cause the controller device to:

detect a speed of a vehicle, and disable commencement of an illumination pattern if the detected speed is greater than zero.

16. The apparatus of claim 1, further comprising:

a communication protocol device configured to communicate messages by way of a communication path of the vehicle according to a predetermined communication protocol.

17. The apparatus of claim 16, wherein the communication path includes a controller area network (CAN) bus, and wherein the communication protocol device facilitates communication by way of the CAN bus.

18. The apparatus of claim 1, wherein the first communication port is an on-board diagnostics port.

19. A method for automotive lamp illumination control, the method comprising:

detecting a user input command entered by way of one or more user input devices;

determining whether the user input command corresponds to an action among a plurality of predetermined actions including at least one of commencing an illumination pattern, terminating the illumination pattern, or switching the illumination pattern; and in a case where it is determined that the user input command corresponds to the action among the plurality of predetermined actions, causing the action to be executed.

20. A non-transitory computer-readable medium having stored thereon instructions that, when executed by a processor, cause the processor to implement a method for automotive lamp illumination control, the method comprising:

detecting a user input command entered by way of one or more user input devices;

determining whether the user input command corresponds to an action among a plurality of predetermined actions including at least one of commencing an illumination pattern, terminating the illumination pattern, or switching the illumination pattern; and in a case where it is determined that the user input command corresponds to the action among the plurality of predetermined actions, causing the action to be executed.

* * * * *